United States Patent [19]

Meisner

[11] 4,312,484
[45] Jan. 26, 1982

[54] INFLATABLE FLOW CONTROL

[75] Inventor: David J. Meisner, Monmouth Beach, N.J.

[73] Assignee: The Garrett Corporation, Los Angeles, Calif.

[21] Appl. No.: 36,124

[22] Filed: May 4, 1979

[51] Int. Cl.³ .............................................. B64C 25/56
[52] U.S. Cl. ..................................... 244/17.17; 52/2; 137/852; 180/124; 9/11 A; 244/100 A; 244/107
[58] Field of Search ........... 244/105, 107, 101, 100 A, 244/118 P, 137 P, DIG. 2, 17.17; 52/2; 137/852, 859; 182/48; 114/219, 292; 180/124, 116, 128, 127; 9/11 A; 267/65 A

[56] References Cited

U.S. PATENT DOCUMENTS

| | | | |
|---|---|---|---|
| 1,969,118 | 8/1934 | Brucker | 137/852 |
| 2,404,578 | 7/1946 | Liska | 137/852 |
| 2,465,193 | 3/1949 | Boyle | 244/105 |
| 2,710,978 | 6/1955 | Alderfer | 9/11 A |
| 2,773,686 | 12/1956 | Nash | 267/65 A |
| 2,944,771 | 7/1960 | Bush | 244/100 R |
| 3,004,737 | 10/1961 | Boyle et al. | 244/105 |
| 3,043,404 | 7/1962 | Peras | 137/852 |
| 3,363,717 | 1/1968 | Hunt | 180/128 |
| 3,414,077 | 12/1968 | Earl | 244/100 R |
| 3,598,215 | 8/1971 | Summer et al. | 244/DIG. 2 |
| 3,669,217 | 6/1972 | Fisher | 244/DIG. 2 |
| 3,782,494 | 1/1974 | Simpson | 180/128 |
| 3,860,984 | 1/1975 | Fisher | 244/DIG. 2 |
| 3,863,732 | 2/1975 | Crewe | 180/124 |
| 3,907,061 | 9/1975 | Chapman et al. | 180/128 |
| 3,915,421 | 10/1975 | Forestier | 267/65 A |
| 3,921,753 | 11/1975 | Pont | 180/127 |

Primary Examiner—Galen L. Barefoot
Attorney, Agent, or Firm—Joseph A. Yanny; Albert J. Miller

[57] ABSTRACT

A flow control is provided between an inflatable and a smaller inflatable log which positions the inflatable with respect to the craft to which it is affixed. The flow control permits the inflation of the positioning log through the inflatable but restricts the flow of fluid back from the positioning log to the inflatable.

5 Claims, 9 Drawing Figures 4,312,484

INFLATABLE FLOW CONTROL

BACKGROUND OF THE INVENTION

When an inflatable such as a float, evacuation slide, or slide raft is used with a helicopter or aircraft, it is extremely important that the inflatable be properly positioned with respect to the craft to insure that it will function as intended. Positioning tubes or logs, inflatable from the same source as the inflatable, have been used both with respect to helicopter floats and evacuation slides. For example, refer to U.S. Pat. No. 3,598,215 assigned to the same assignee as this application.

In prior systems of the type, unrestricted openings have been provided between the inflatable and the positioning log with the same source of pressurized fluid used to inflate both. Thus when a load was applied to the inflatable, it would deform and be opposed by an equal resultant bearing load. With open communication between the inflatable and the log, the pressure in both remained essentially constant under load. Without any appreciable pressure increase in the log under load, the required contact area to maintain equilibrium increased as the applied load increased. As a result, the positioning log was either required to be larger and thus heavier to properly position the inflatable or a costly complex contoured shape was required.

SUMMARY OF THE INVENTION

A flow control for use between an inflatable, such as a helicopter float or aircraft evacuation slide, and an inflatable log which positions the float or slide with respect to the helicopter or aircraft. The flow control permits the inflation of the positioning log through the inflatable but restricts the flow of fluid back from the positioning log to the inflatable. Accordingly, the log can be of a simple configuration and smaller and lighter than would otherwise be required to properly position the inflatable under applied loads.

DETAILED DESCRIPTION OF THE PREFERRED EMBODIMENT

Figure 1:
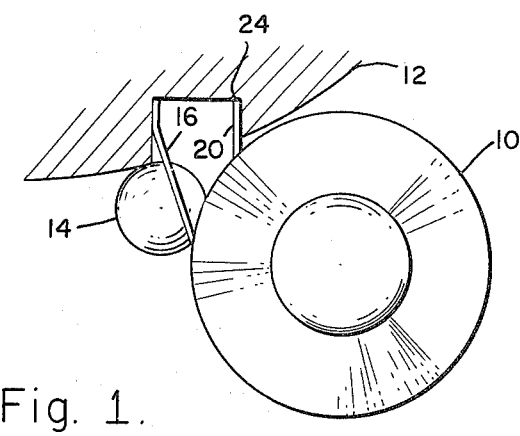
FIG. 1 is a front view of the helicopter float and positioning log on a helicopter.
Figure 2:
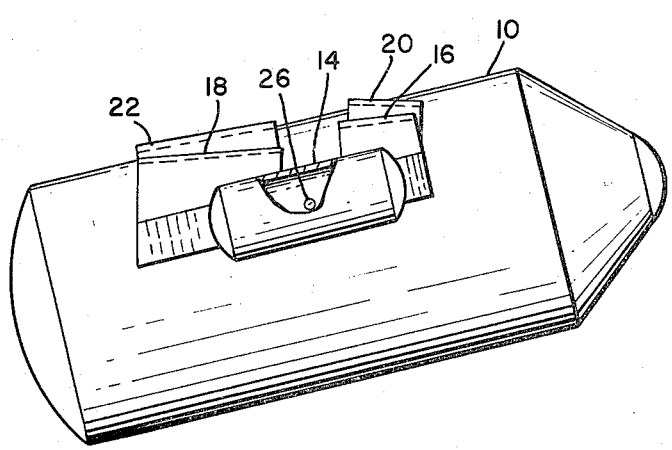
FIG. 2 is a side elevation view of the helicopter float and positioning log of FIG. 1, partially cut away to show the flow control therebetween.

As generally shown in FIGS. 1 and 2 the inflated float 10 is positioned outward from the helicopter fuselage 12 by a positioning tube or log 14. The float 10 is held against the fuselage by inboard girths 16 and 18 and outboard girths 20 and 22. The helicopter will include both right and left side floats to establish a stable platform either on the ground or water. The greater the distance between the right and left hand floats, the greater the stability. Likewise, the helicopter would normally include both a fore pair of floats and an aft pair of floats. When in an uninflated condition, the forward floats are stored in compartments 24 in the helicopter fuselage 12. The flow control 26 is located between the float 10 and log 14.

Figure 2A:
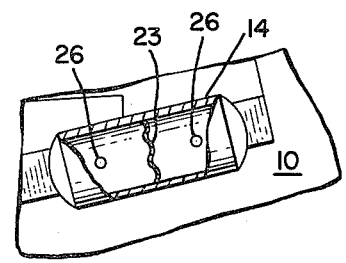
FIG. 2A is a partial side elevation view of the helicopter float and positioning log of FIG. 1, partially cut away to show a two cell positioning log.

Alternately, as shown in FIG. 2A, the float 10 and log 14 may be divided into more than one air holding cell or chamber separated by a bulkhead 23. In that case, each individual air holding cell will include a flow control device 26.

Both the float 10 and log 14 can be made of any suitable water impervious, air holding material or fabric such as a urethane elastomer coated nylon. Each is constructed to be a separate air holding chamber.

Figure 3:
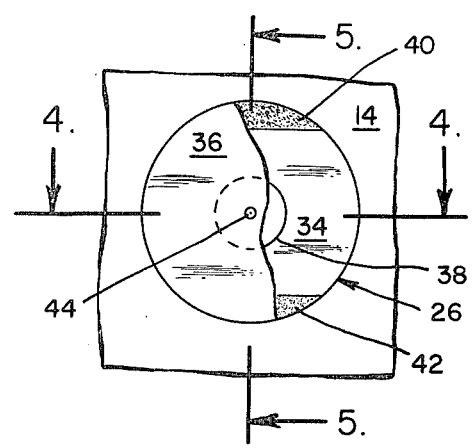
FIG. 3 is an enlarged plan view of the flow control shown in FIG. 2.
Figure 4:
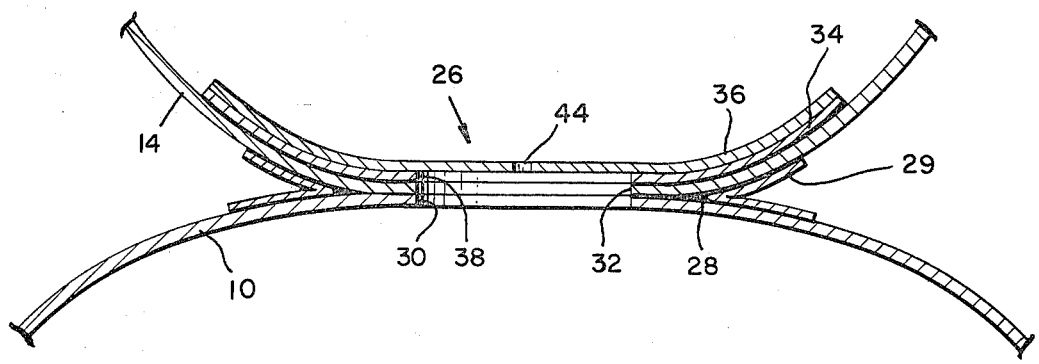
FIG. 4 is a sectional view of the flow control taken along line 4—4 of FIG. 3.
Figure 5:
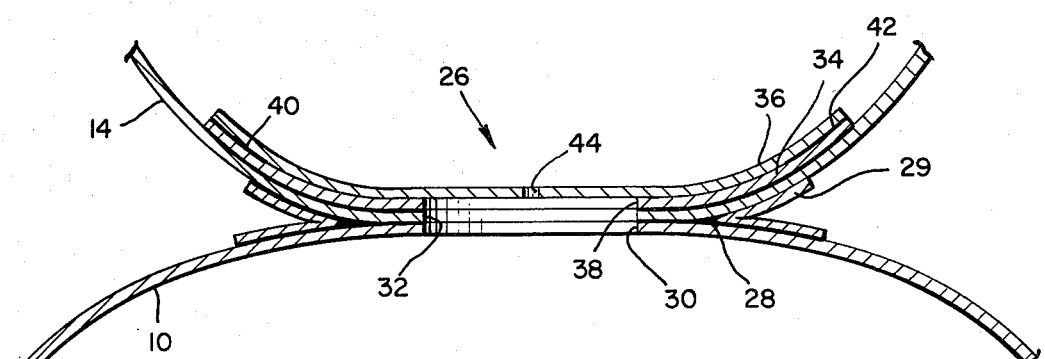
FIG. 5 is a sectional view of the flow control taken along line 5—5 of FIG. 3.

As shown in FIGS. 3, 4 and 5, the float 10 and log 14 are bonded, glued, or otherwise affixed together along the entire length of the log 14 and it is within this bond 28 that the flow control 26 is to be found. A crotch tape 29 is utilized to strengthen this bond. Within this bond 28, the float 10 includes an opening 30 and the log 14 includes a similar aligned opening 32. The flow control 26 is bonded to the interior of the log 14 over the aligned openings 30 and 32. The flow control 26 basically comprises a base 34 and flapper 36 both of the same or a similar fabric to that of the float and log. The base 34 includes an opening 38 of generally the same size and aligned with the openings 30 and 32 in the float 10 and log 14 respectively. The flapper 36 is bonded (e.g. heat sealed) to the base 34 at opposite edges 40 and 42 but is otherwise not affixed to the base 34. The flapper 36 includes a small central opening 44 generally aligned with the larger openings 38, 32 and 30.

Figure 7:
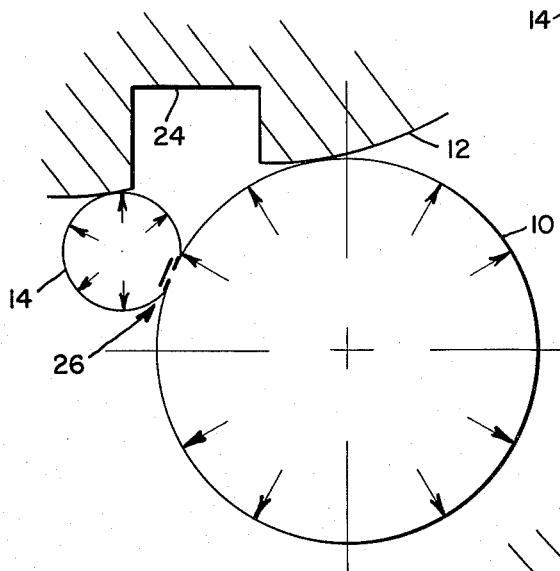
FIG. 7 is an enlarged schematic view of the helicopter float and positioning log illustrating the flow control at equilibrium.
Figure 6:
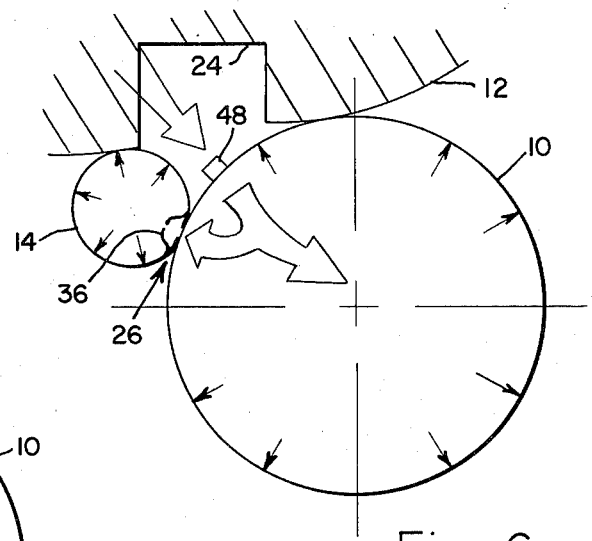
FIG. 6 is an enlarged schematic view of the helicopter float and positioning log illustrating the flow control during inflation.

FIG. 6 schematically illustrates the operation of the flow control 26 during inflation of the float 10 and log 14. Compressed fluid is provided from a compressed fluid source (not shown) to an inflation fitting 48 on the float 10. During the initial stages of inflation, the fluid under pressure flows into the float 10 and the float 10 begins to assume its cylindrical shape. As fluid pressure begins to build up in the float 10, this pressure acts to lift the flow control flapper 36 away from the flow control base 34. This permits the free flow of compressed fluid into the positioning log 14. Once the float 10 and log 14 are fully inflated, the pressure in the float and log will reach an equilibrium and the flapper 36 will return to its rest position on the base 34 as shown schematically in FIG. 7. The arrows are provided in FIG. 6 to generally illustrate the flow of compressed fluid. While the fluid pressure inside the float may vary depending upon the particular application, the useful pressure range will generally be between 0.75 psig and 6.0 psig.

Figure 8:
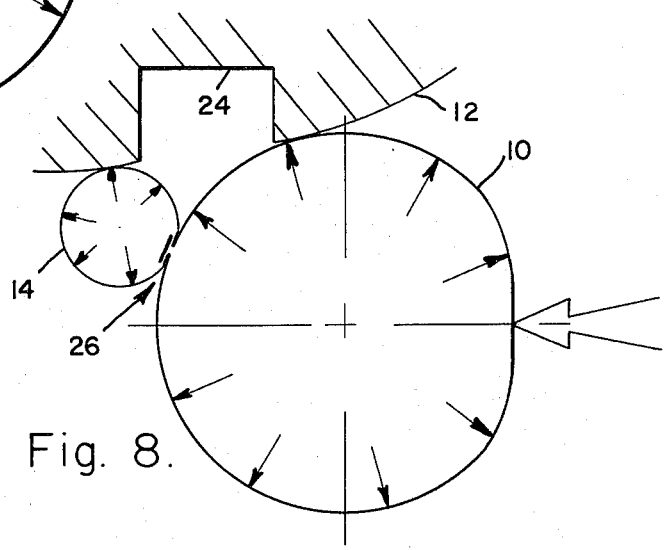
FIG. 8 is an enlarged schematic view of the helicopter float and positioning log illustrating their condition when a side load is applied to the helicopter float.

Whenever a side load (shown as a large arrow) is applied to the helicopter float 10 as schematically illustrated in FIG. 8, the float 10 is caused to rotate clockwise toward the positioning log 14. Since the flow control 26 restricts the flow of fluid from the log 14 to the float 10, the log 14 is thus compressed and the pressure rises therein. Since the ideal gas laws state that pressure is inversely proportional to the volume, the pressure rises as the volume is compressed. This increased pressure restricts and otherwise reduces the inboard motion of the float 10. The small hole 49 in the flow control flapper 36 prevents the buildup of an excessive pressure in the log 14.

If the final equilibrium pressure of the float 10 and log 14 is assumed to be 0.75 psig and a side load in the order of magnitude of 300 pounds is applied as shown in FIG. 8, the internal fluid pressure would rise to the neighborhood of 3.5 psig. It is known that the contact area (bearing surface) between the aircraft and an inflatable is inversely proportional to the inflation pressure of the inflatable and directly proportional to the applied force. This can be expressed in equation form as:

$$A = F/P$$

where
- A is the contact area in square inches,
- F is the applied force in pounds, and
- P is the internal fluid pressure in pounds per square inch.

Under an applied load, the inflatable, in this case the float 10, will deform to a point where the applied load is opposed by an equal resultant bearing load. If the pressure in the log increases as the applied load increased, as it will if the flow of gas is prevented from leaving the log, the required contact area will not increase directly. Where there is no flow control between the float and log, that is there is open communication, the pressure in the log will remain essentially constant under an applied load since the total volume of the log and float is very large as compared to the applied load. Thus in case of open communication, in order to maintain equilibrium as applied load increased, the required contact area likewise increased almost proportionally.

In designing a positioning log, it is obviously desirable to provide the smallest and lightest log which is still capable of performing the required function. Its size can be determined from the expected applied load and the design fluid pressure for the inflatable. The equation above then permits the determination of the required contact area under any given condition. Patterning the log as a cylinder, the length and diameter can be calculated directly from the required contact area.

Since the pressure in the log will increase under applied load, a smaller lighter log can be utilized with the flow control. It thus provides the same advantages of a contoured shape without the complex patterning required to produce it.

While specific embodiments of the invention have been illustrated and described, it is to be understood that these embodiments have been provided by way of example only and that the invention is not to be construed as being limited thereto, but only by the proper scope of the following claims.

What I claim is:

1. A helicopter float assembly comprising:
a generally cylindrically configured inflatable helicopter float adapted to be mounted on a helicopter;
a generally cylindrically configured helicopter float positioning log generally axially aligned with said helicopter float, substantially smaller in volume and affixed to said helicopter float along an adjacent lateral surface, said helicopter float and said helicopter float positioning log having a fluid communicating opening therebetween in the lateral surface at which they are affixed together; and
a flow control device affixed to the interior of said helicopter float positioning log around the fluid communicating opening in the lateral surface affixed to the helicopter float, said flow control device including a generally circular base member affixed to the interior of the helicopter float positioning log around the fluid communicating opening therein and having an opening therethrough generally coextensive with the fluid communicating opening, and a generally circular flapper member disposed over said base member and affixed to said base member along two opposed circumferential edges thereof but otherwise free to extend outward from said base member to permit the inflation of said helicopter float positioning log from said helicopter float, said flapper member including a small bleed opening over the opening in the base member to restrict the flow of fluid from the helicopter float positioning log to said helicopter float.

2. A helicopter float assembly comprising:
a generally cylindrically configured inflatable helicopter float adapted to be mounted on a helicopter;
a generally cylindrically configured helicopter float positioning log generally axially aligned with said helicopter float, substantially smaller in volume and affixed to said helicopter float along an adjacent lateral surface, said helicopter float and said helicopter float positioning log having a fluid communicating opening therebetween in the lateral surface at which they are affixed together; and
a flow control device affixed to the interior of said helicopter float positioning log around the fluid communicating opening in the lateral surface affixed to the helicopter float, said flow control device including a base member affixed to the interior of the helicopter float positioning log around the fluid communicating opening therein and having an opening therethrough generally coextensive with the fluid communicating opening, and a flapper member disposed over said base member and affixed to said base member but otherwise free to extend outward from said base member to permit the inflation of said helicopter float positioning log from said helicopter float, said flapper member including a small bleed opening over the opening in the base member to restrict the flow of fluid from the helicopter float positioning log to said helicopter float.

3. A helicopter float assembly comprising:
an inflatable fluid holding helicopter float adapted to be mounted on a helicopter;
an inflatable fluid holding helicopter float positioning log in juxtaposition to said inflatable helicopter float and operably associated therewith at a point of contact between the exteriors thereof to position said float with respect to the helicopter, said float and said log having a fluid communicating opening therebetween at said point of contact; and
flow control means disposed in the fluid communicating opening between said helicopter float and said helicopter float positioning log to permit the inflation of said helicopter float positioning log through said helicopter float but to restrict the flow of fluid from said helicopter float positioning log to said helicopter float, said flow control means comprising a base member disposed over the fluid communicating opening between said helicopter float and said helicopter float positioning log and having an opening coextensive with the fluid communicating opening and a flapper member having a bleed opening therein affixed at two opposed edges to said base member but otherwise free to extend outward from said base member when said helicopter float positioning log is inflated from said helicopter float.

4. A helicopter float assembly comprising:

a multi-chambered inflatable fluid holding helicopter float adapted to be mounted on a helicopter;

a multi-chambered inflatable fluid holding helicopter float positioning log in juxtaposition to said inflatable helicopter float and operably associated therewith at points of contact between the exteriors thereof to position said float with respect to the helicopter, said float and said log having fluid communicating openings therebetween at said points of contact to communicate each helicopter float chamber having a fluid communicating opening with a corresponding chamber of the helicopter float positioning log; and flow control means disposed in each fluid communicating opening between said helicopter float chambers and said helicopter float positioning log chambers to permit the inflation of said helicopter float positioning log through said helicopter float but to restrict the flow of fluid from said helicopter float positioning log to said helicopter float, said flow control means including a base member disposed over the fluid communicating opening between said helicopter float chambers and said helicopter float positioning log chambers having an opening coextensive with the fluid communicating opening and a flapper member having a bleed opening therein affixed to two opposed edges to said base member but otherwise free to extend outward from said base member when said helicopter float positioning log is inflated from said helicopter float.

5. The helicopter float assembly of claim 3 or 4 wherein said base member and said flapper member of said flow control means are both circular.

* * * * *